US012572089B2

(12) United States Patent
Hozumi

(10) Patent No.: US 12,572,089 B2
(45) Date of Patent: Mar. 10, 2026

(54) IMAGE FORMING APPARATUS

(71) Applicant: Yoshiki Hozumi, Kanagawa (JP)

(72) Inventor: Yoshiki Hozumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/905,442

(22) Filed: Oct. 3, 2024

(65) Prior Publication Data

US 2025/0147444 A1 May 8, 2025

(30) Foreign Application Priority Data

Nov. 7, 2023 (JP) ................................ 2023-189921

(51) Int. Cl.
*G03G 15/16* (2006.01)
*G03G 15/01* (2006.01)

(52) U.S. Cl.
CPC ..... *G03G 15/0189* (2013.01); *G03G 15/1605* (2013.01)

(58) Field of Classification Search
CPC ........... G03G 15/0189; G03G 15/1605; G03G 15/1615
See application file for complete search history.

(56) References Cited

U.S. PATENT DOCUMENTS 6,324,374 B1 11/2001 Sasamoto et al.
8,099,031 B2 * 1/2012 Kitagawa ........... G03G 15/0136 399/302
2009/0162087 A1 6/2009 Suzuki et al.
2011/0064466 A1 * 3/2011 Inada .................. G03G 15/161 399/302

(Continued)

FOREIGN PATENT DOCUMENTS

JP 2005-195648 A 7/2005
JP 2007-093781 A 4/2007

(Continued)

OTHER PUBLICATIONS

Extended European Search Report dated Mar. 21, 2025 issued in corresponding European Patent Appln. No. 24204281.0.

*Primary Examiner* — Hoang X Ngo
(74) *Attorney, Agent, or Firm* — Harness, Dickey & Pierce, P.L.C.

(57) ABSTRACT

An image forming apparatus includes a plurality of image bearers, a plurality of frame members, a plurality of contact members, an intermediate transferor, a plurality of primary transfer members, a plurality of holding members, an intermediate transferor frame, a plurality of pressure members, and a plurality of pressing members. The plurality of holding members hold the plurality of primary transfer members. The intermediate transferor frame holds the intermediate transferor and the plurality of holding members. The plurality of pressure members press the plurality of holding members. The plurality of pressing members press the plurality of image bearers. The plurality of image bearers is positioned with the plurality of frame members pressed toward the intermediate transferor frame by the plurality of pressing members. The plurality of primary transfer members are positioned with the plurality of holding members contacted against the intermediate transferor frame by the plurality of pressure members.

5 Claims, 8 Drawing Sheets

(56) References Cited

U.S. PATENT DOCUMENTS

| | | | | |
|---|---|---|---|---|
| 2012/0070171 | A1* | 3/2012 | Matsushita ........ | G03G 15/0194 399/82 |
| 2012/0251193 | A1 | 10/2012 | Ohashi et al. | |
| 2013/0306440 | A1 | 11/2013 | Asaoka et al. | |
| 2014/0008184 | A1 | 1/2014 | Hozumi et al. | |
| 2014/0083821 | A1 | 3/2014 | Hozumi et al. | |
| 2014/0183007 | A1 | 7/2014 | Hozumi et al. | |
| 2014/0209437 | A1 | 7/2014 | Hozumi et al. | |
| 2015/0090564 | A1 | 4/2015 | Iwaya et al. | |
| 2015/0125189 | A1 | 5/2015 | Hozumi et al. | |
| 2016/0103404 | A1 | 4/2016 | Hasegawa | |
| 2016/0251166 | A1 | 9/2016 | Hozumi et al. | |
| 2017/0242387 | A1 | 8/2017 | Hozumi et al. | |
| 2018/0120739 | A1 | 5/2018 | Hozumi | |
| 2018/0267437 | A1 | 9/2018 | Hozumi | |
| 2020/0241450 | A1 | 7/2020 | Hozumi | |
| 2020/0301321 | A1 | 9/2020 | Kumagai et al. | |
| 2020/0301322 | A1 | 9/2020 | Kumagai et al. | |

FOREIGN PATENT DOCUMENTS

| | | | |
|---|---|---|---|
| JP | 2007-108788 | A | 4/2007 |
| JP | 2008-122596 | A | 5/2008 |
| JP | 2008-309815 | A | 12/2008 |
| JP | 2010-197774 | A | 9/2010 |
| JP | 2013-113907 | A | 6/2013 |
| JP | 2016-045366 | A | 4/2016 |
| JP | 2016-075856 | A | 5/2016 |
| JP | 2017-016072 | A | 1/2017 |

* cited by examiner

IMAGE FORMING APPARATUS

CROSS-REFERENCE TO RELATED APPLICATION

This patent application is based on and claims priority pursuant to 35 U.S.C. § 119(a) to Japanese Patent Application No. 2023-189921, filed on Nov. 7, 2023, in the Japan Patent Office, the entire disclosure of which is hereby incorporated by reference herein.

BACKGROUND

Technical Field

Embodiments of the present disclosure relate to an image forming apparatus.

Related Art

In a color printer, in order to extend the life of a photoconductor, a technology is known that primary transfer rollers for colors other than black are separated from the photoconductors corresponding to the colors in the monochrome mode. In such a technology, a holding member is disposed for each of the primary transfer roller and a backup roller, and the primary transfer roller and the backup roller are separated from the photoconductor by a moving mechanism. The backup roller is a roller for determining the shape of an intermediate transfer belt to set a transfer nip between the primary transfer roller and the backup roller on the most upstream side in a rotation direction of the intermediate transfer belt to a target condition. In the above-described image forming apparatus (or a printer), the holding member is disposed for each of the primary transfer roller and the backup roller, the distance between the primary transfer roller and the backup roller is increased, so that the image forming apparatus is increased in size, and thus the manufacturing cost of the image forming apparatus is increased.

SUMMARY

In an embodiment of the present disclosure, an image forming apparatus includes a plurality of image bearers, a plurality of frame members, a plurality of contact members, an intermediate transferor, a plurality of primary transfer members, a plurality of holding members, an intermediate transferor frame, a plurality of pressure members, and a plurality of pressing members. The plurality of image bearers bear toner images. The plurality of frame members hold the plurality of image bearers, respectively. The plurality of contact members position the plurality of image bearers, respectively. The intermediate transferor is movable to secondarily transfer the toner images primarily transferred from the plurality of image bearers onto a recording medium. The plurality of primary transfer members primarily transfer the toner images from the plurality of image bearers onto the intermediate transferor at primary transfer portions, respectively, at which the plurality of image bearers contact an outer circumferential surface of the intermediate transferor. The plurality of holding members hold the plurality of primary transfer members, respectively. The intermediate transferor frame holds the intermediate transferor and the plurality of holding members, with the plurality of holding members being rotatable. The plurality of pressure members press the plurality of holding members. The plurality of pressing members press the plurality of frame members and the plurality of contact members toward the intermediate transferor frame or a body structure side plate. One end of the plurality of image bearers is positioned with the plurality of frame members and the plurality of contact members pressed toward the intermediate transferor frame by the plurality of pressing members. The plurality of primary transfer members are positioned on a same side as the one end, with the plurality of holding members contacted against the intermediate transferor frame by the plurality of pressure members.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
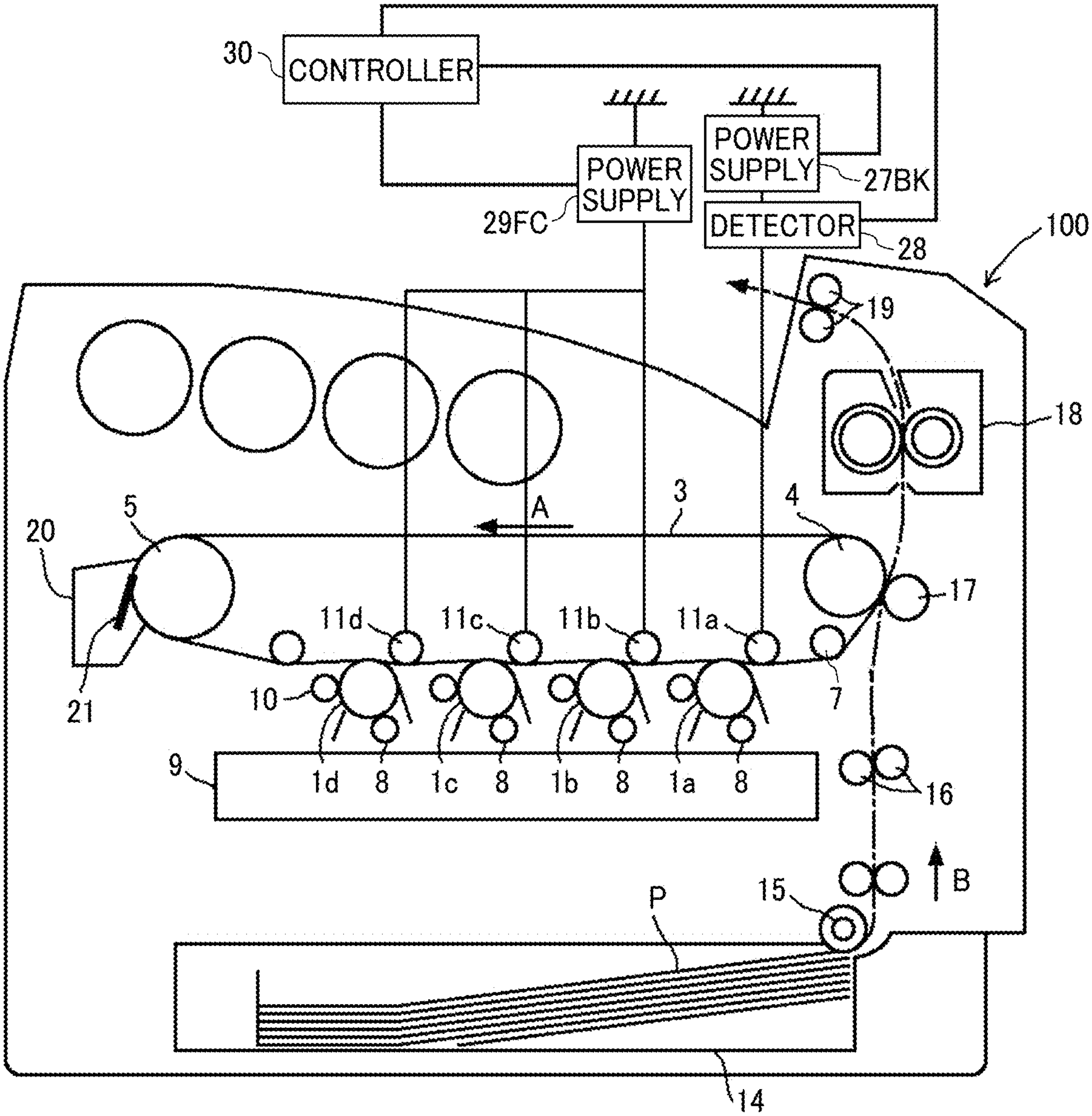
FIG. 1 is a schematic view of an image forming apparatus as a printer.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a diagram illustrating an example of an image forming apparatus 100 configured as a printer. The image forming apparatus 100 illustrated in FIG. 1 is provided with a plurality of photoconductors (an example of image bearers), for example, first to fourth photoconductors 1*a*, 1*b*, 1*c*, and 1*d* (hereinafter, referred to as "photoconductor 1" as appropriate when colors are not distinguished) in FIG. 1 in a body of the image forming apparatus 100. Toner images in different colors are formed on the respective photoconductors. In the example illustrated in FIG. 1, a black toner image, a magenta toner image, a cyan toner image, and a yellow toner image are formed on the photoconductors 1*a*, 1*b*, 1*c*, and 1*d*, respectively. The photoconductors 1*a*, 1*b*, 1*c*, and 1*d* in FIG. 1 are drum-shaped photoconductors but may be endless-belt shaped photoconductor belts to rotate while being wound around multiple rollers.

An intermediate transfer belt 3 as an intermediate transfer member is disposed facing the first to fourth photoconductors 1*a*, 1*b*, 1*c*, and 1*d*. The photoconductors 1*a*, 1*b*, 1*c*, and 1*d* contact the surface of the intermediate transfer belt 3. The intermediate transfer belt 3 secondarily transfers toner images, which have been primarily transferred to the intermediate transfer belt 3 from the photoconductors 1*a*, 1*b*, 1*c*, and 1*d* onto a recording medium P. The intermediate transfer belt 3 illustrated in FIG. 1 is wound around a drive roller 4, a tension roller 5, and an entrance roller 7. One of these support rollers, for example, the support roller 4 functions as a drive roller driven by a drive source. The intermediate transfer belt 3 is rotated by the drive of the drive roller in the direction illustrated by arrow A. The intermediate transfer belt 3 may include either a plurality of layers or a single layer. The plurality of layers preferably includes a base layer having an outer circumferential surface coated by a smooth coating layer made of, e.g., fluorine-based resin. The base layer may be made of, for example, a stretch-resistant fluororesin, polyvinylidene difluoride (PVDF) sheet, or polyimide resin. The single layer may be preferably made of, for example, PVDF, polycarbonate (PC), or polyimide.

The configuration for forming toner images on the photoconductors 1*a*, 1*b*, 1*c*, and 1*d* and the configuration for transferring the toner images onto the intermediate transfer belt 3 are all substantially the same, except the colors of the respective toner images formed on the photoconductors 1*a*, 1*b*, 1*c*, and 1*d*. Accordingly, a description is given of only the configuration and operation for forming a black toner image on the first photoconductor 1*a* and transferring the black toner image onto the intermediate transfer belt 3. The photoconductor 1*a* is rotated in a counterclockwise direction as indicated by the arrow A in FIG. 1. At this time, the surface of the photoconductor 1*a* is irradiated with light from a charge elimination device, so that the surface potential of the photoconductor 1*a* is initialized. The initialized surface of the photoconductor 1*a* is uniformly charged to a specified polarity, e.g., a negative polarity in this example by a charging device 8. The charged surface is irradiated with a light-modulated laser beam L emitted from an exposure device 9. As a result, electrostatic latent images corresponding to image data are formed on the surface of the photoconductor 1*a*. In the image forming apparatus 100 illustrated in FIG. 1, the exposure device 9 as a laser writing device that emits a laser beam is used. Alternatively, an exposure device having a light-emitting diode (LED) array and an imaging device can also be used.

The electrostatic latent image formed on the photoconductor 1*a* is visualized as a visible black toner image when the electrostatic latent image passes a developing device 10. On the other hand, inside the intermediate transfer belt 3, primary transfer rollers 11*a*, 11*b*, 11*c*, and 11*d* (hereinafter, referred to as a "primary transfer roller 11" as appropriate when colors are not distinguished) as primary transfer members positioned substantially opposite to the photoconductors 1*a*, 1*b*, 1*c*, and 1*d* via the intermediate transfer belt 3 are arranged. The primary transfer roller 11 contacts the back surface of the intermediate transfer belt 3, so that an appropriate transfer nip between the photoconductor 1*a* and the intermediate transfer belt 3 is ensured. The primary transfer roller 11 is made of metal and is arranged with slight offset relative to the photoconductor 1 (an indirect transfer method). In the present embodiment, a belt distance (offset amount) between the photoconductor 1 and the primary transfer roller 11 in which the intermediate transfer belt 3 does not contact any of the photoconductor 1 and the primary transfer roller 11 is 4 to 5 mm.

A transfer voltage having a polarity (e.g., a positive polarity in this example) opposite to the toner charge polarity of the toner image formed on the photoconductor 1*a* is applied to the primary transfer roller 11. Accordingly, a transfer electric field is formed between the photoconductor 1*a* and the intermediate transfer belt 3, and in the primary transfer section where the photoconductor 1*a* and the outer circumferential surface of the intermediate transfer belt 3 contact with each other, the toner image on the photoconductor 1*a* is electrostatically transferred onto the intermediate transfer belt 3 which is rotated in synchronization with the photoconductor 1*a* (primary transfer process). Untransferred toner adhering to the surface of the photoconductor 1*a* after the toner image is transferred to the intermediate transfer belt 3 is removed by a cleaning device, and the surface of the photoconductor 1*a* is cleaned.

In the same manner, a magenta toner image, a cyan toner image, and a yellow toner image are formed on the second to fourth photoconductors 1*b*, 1*c*, and 1*d*, respectively. The toner images of the respective colors are sequentially superimposed and electrostatically transferred onto the intermediate transfer belt 3 on which the black toner image is transferred.

The image forming apparatus 100 has two types of modes, which are a full-color mode in which four color toner images are used and a black monochrome mode in which a black toner image alone is used. In the full-color mode, the intermediate transfer belt 3 and the photoconductors 1 of four colors contact with each other, and toner of all four colors is transferred onto the intermediate transfer belt 3. On the other hand, in the black monochrome mode, only the black photoconductor 1*a* contacts the intermediate transfer belt 3 and only the black toner is transferred onto the intermediate transfer belt 3. At this time, the intermediate transfer belt 3 and the magenta, cyan, and yellow photoconductors 1*b*, 1*c*, and 1*d* are not contacted with each other, and the primary transfer rollers 11*b*, 11*c*, and 11*d* are separated from the photoconductors 1*b*, 1*c*, and 1*d* by a contact-and-separation mechanism 90 included in the image forming apparatus 100.

On the other hand, as illustrated in FIG. 1, a sheet feeding device 14 is disposed in a lower portion of the apparatus body, and the sheet feeding device 14 feeds a recording medium P made of, for example, a transfer paper in a direction indicated by arrow B by rotation of a sheet feed roller 15. The recording medium P that has been sent out is fed by a registration roller pair 16 at a specified timing to between a portion of the intermediate transfer belt 3 wound around the support roller 4 and a secondary transfer roller 17 that is opposite the portion of the intermediate transfer belt 3. At this time, a specified transfer voltage is applied to the secondary transfer roller 17, and thus the composite toner image on the intermediate transfer belt 3 is secondarily transferred onto the recording medium P.

The recording medium P on which the composite toner image is secondarily transferred is further conveyed upward and passes a fixing device 18. At this time, the toner image on the recording medium P is fixed by the action of heat and pressure. The recording medium P that has passed the fixing device 18 is ejected to the outside of the image forming apparatus 100 via a sheet ejection roller pair 19 disposed in a sheet ejection section.

The untransferred toner adhering to the intermediate transfer belt 3 after transfer of the toner image is removed by a belt cleaner 20. The belt cleaner 20 according to the present embodiment includes a cleaning blade 21 having a blade shape made of, for example, urethane. The cleaning blade 21 contacts the outer circumferential surface of the intermediate transfer belt 3 in a counter direction with respect to the moving direction of the intermediate transfer belt 3. As is clear to a person skilled in the art, various types of belt cleaners can be used as the belt cleaner 20 as appropriate, and for example, the belt cleaner 20 may be a capacitance type.

The untransferred toner removed from the intermediate transfer belt 3 by the cleaning blade 21 is sent to the rear side in a longitudinal direction by a waste-toner coil in a cleaning case of the belt cleaner 20, and is conveyed to a waste-toner container via a waste-toner passage disposed in the apparatus body.

FIG. 1 illustrates an example of a diagram of an applied power supply used in the present embodiment. A primary-transfer-bias power supply 27BK that is a primary transfer power supply for applying a voltage to the primary transfer roller 11*a* is connected to a detector 28 and a controller 30. The detector 28 is connected to the primary-transfer-bias power supply 27BK, the primary transfer roller 11*a*, and the controller 30. The detector 28 is connected to only the primary transfer roller 11*a* corresponding to the photoconductor 1*a* of one color (black in the present embodiment) of the photoconductors 1*a*, 1*b*, 1*c*, and 1*d* of all colors.

When the output of the primary-transfer-bias power supply 27BK is under constant-voltage control, the detector 28 is a primary-transfer-current detector that detects the amount of current flowing through the primary transfer roller 11*a* when a bias is applied to the primary transfer roller 11*a*. When the output of the primary-transfer-bias power supply 27BK is under constant-current control, the detector 28 detects an output bias of the primary-transfer-bias power supply 27BK.

Voltages are applied to the other primary transfer rollers 11*b*, 11*c*, and 11*d* by another primary-transfer-bias power supply 29FC. Accordingly, the image forming apparatus 100 includes a plurality of primary-transfer-bias power supplies 27BK and 29FC, one of which is coupled with the primary transfer roller 11*a* corresponding to the photoconductor 1*a* for the black toner image, and the detector 28 is also coupled only with the primary transfer roller 11*a* corresponding to the photoconductor 1*a* for the black toner image. As a result, the image forming apparatus 100 need only include one detector 28, which reduces the costs of the configuration of an intermediate transferor unit 60 and the resistance detection configuration. Control for changing the target value of the transfer bias over time and every time the environment changes is unnecessary. Driving the intermediate transfer device and the image bearer each time is not necessary, so that the life of the intermediate transfer member and the image bearer can be extended.

The controller 30 is connected to the primary-transfer-bias power supply 27BK, the primary-transfer-bias power supply 29FC, and the detector 28, and determines the primary transfer voltage of the primary transfer roller 11*a* corresponding to all colors on the basis of a detection result by the detector 28, that is, the current value X detected by the detector 28.

Figure 2:
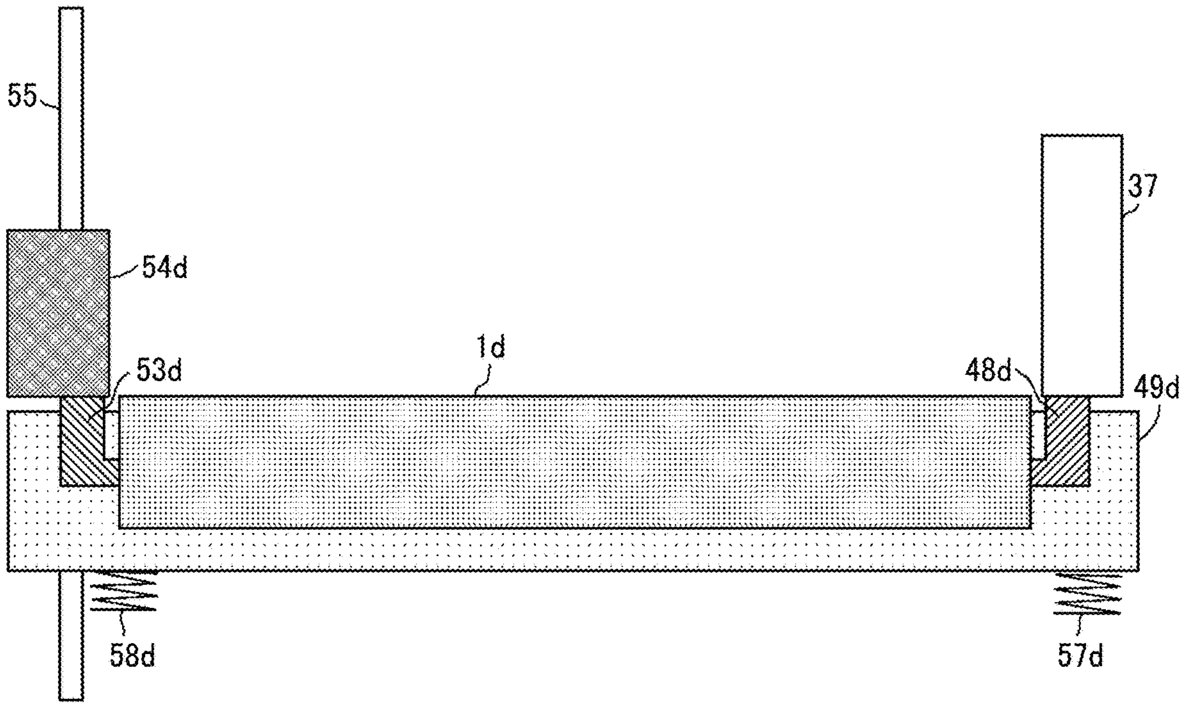
FIG. 2 is a schematic view of an image forming apparatus according to an embodiment of the present disclosure.

FIG. 2 is a schematic view of an image forming apparatus according to an embodiment of the present disclosure. In the image forming apparatus 100, the photoconductors 1*a*, 1*b*, 1*c*, and 1*d* are held by photoconductor frames 49*a*, 49*b*, 49*c*, and 49*d* (examples of frame members), respectively. FIG. 2 representatively illustrates, for example, a photoconductor 1*d* and a photoconductor frame 49*d* on the front side of the image forming apparatus 100. Contact members are disposed at both ends of each of the photoconductors 1*a*, 1*b*, 1*c*, and 1*d* in the longitudinal direction. Specifically, in FIG. 2, a photoconductor contact member 48*d* is disposed on the front side of the photoconductor 1*d* in the removal direction, and a photoconductor contact member 53*d* is disposed on the rear side of the photoconductor 1*d* in the removal direction. The photoconductor frame 49*d* (an example of a frame member) that holds the photoconductor 1*d* is disposed. A photoconductor pressing member 57*d* (an example of a pressing member) is disposed on the front side of the photoconductor frame 49*d* in the removal direction. A photoconductor pressing member 58*d* (an example of a pressing member) is disposed on the rear side of the photoconductor frame 49*d* in the removal direction. The photoconductor contact members 48*d* and 53*d* are contacted against contacted members by the photoconductor pressing members 57*d* and 58*d* to position the photoconductors 1*a*, 1*b*, 1*c*, and 1*d*. However, the contacted members against which the photoconductor contact members 48*d* and 53*d* contact are different. In other words, the photoconductor contact member 48*d* on the front side in the removal direction is positioned by contacting against an intermediate transferor frame 37 or another member disposed on the intermediate transferor frame 37. The photoconductor contact member 53*d* on the rear side in the removal direction is positioned by contacting against a body structure side plate 55 or a body side plate holder 54*d* disposed on the body structure side plate 55.

Figure 3:
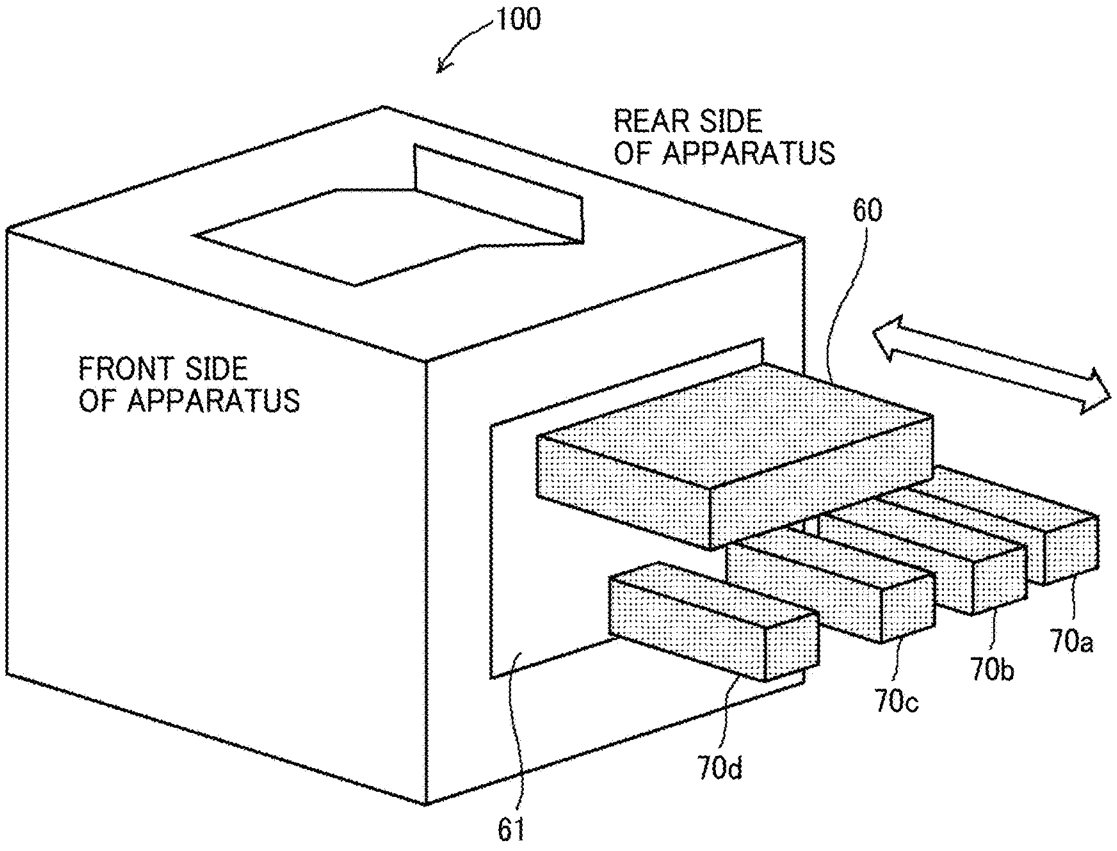
FIG. 3 is a diagram illustrating insertion and removal directions of an intermediate transferor unit and a photoconductor unit into and from an image forming apparatus.

FIG. 3 is a diagram illustrating the insertion and removal directions of the intermediate transferor unit and the photoconductor unit into and from the image forming apparatus. In the present embodiment, the intermediate transferor unit 60 and photoconductor units 70*a*, 70*b*, 70*c*, and 70*d* can be easily inserted into and removed from the image forming apparatus 100 from the right to the left or from the left to the right when viewed from the front of the apparatus. The insertion and removal directions of the intermediate transferor unit 60 are parallel to the insertion and removal directions of the photoconductor units 70*a*, 70*b*, 70*c*, and 70*d*. When an opening-and-closing door of the image forming apparatus 100 is opened, a large opening portion 61 is opened, and thus, the insertion and removal of the intermediate transferor unit 60 and the photoconductor units 70*a*, 70*b*, 70*c* and 70*d* are easy. The intermediate transferor unit 60 includes the intermediate transfer belt 3, the drive roller 4, the tension roller 5, the entrance roller 7, the belt cleaner 20, and the four primary transfer rollers 11*a*, 11*b*, 11*c*, and 11*d* (see FIG. 1). The photoconductor units 70*a*, 70*b*, 70*c*, and 70*d* include the four photoconductors 1*a*, 1*b*, 1*c*, and 1*d*, and four charging devices 8, respectively (see FIG. 1).

Figure 4:
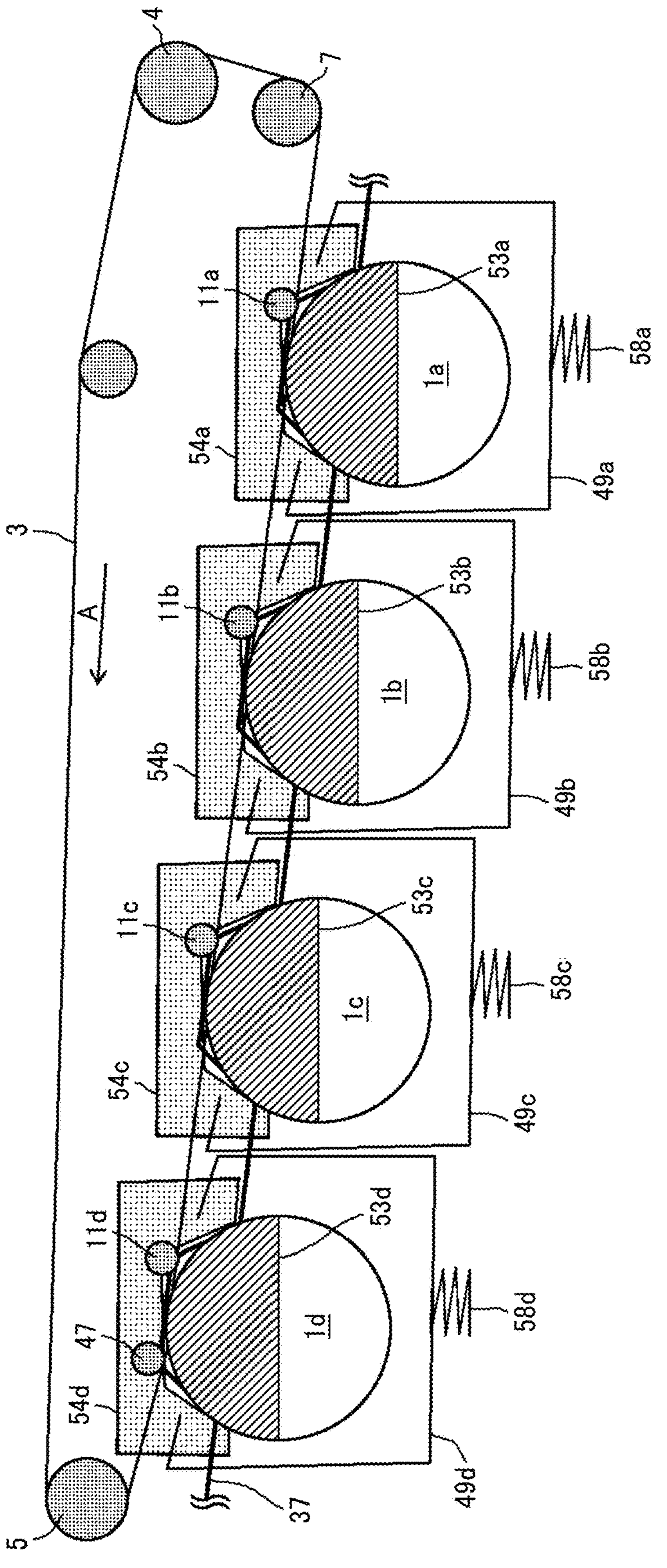
FIG. 4 is a schematic view of an intermediate transferor unit and a photoconductor unit on the rear side in the removal direction.
Figure 5:
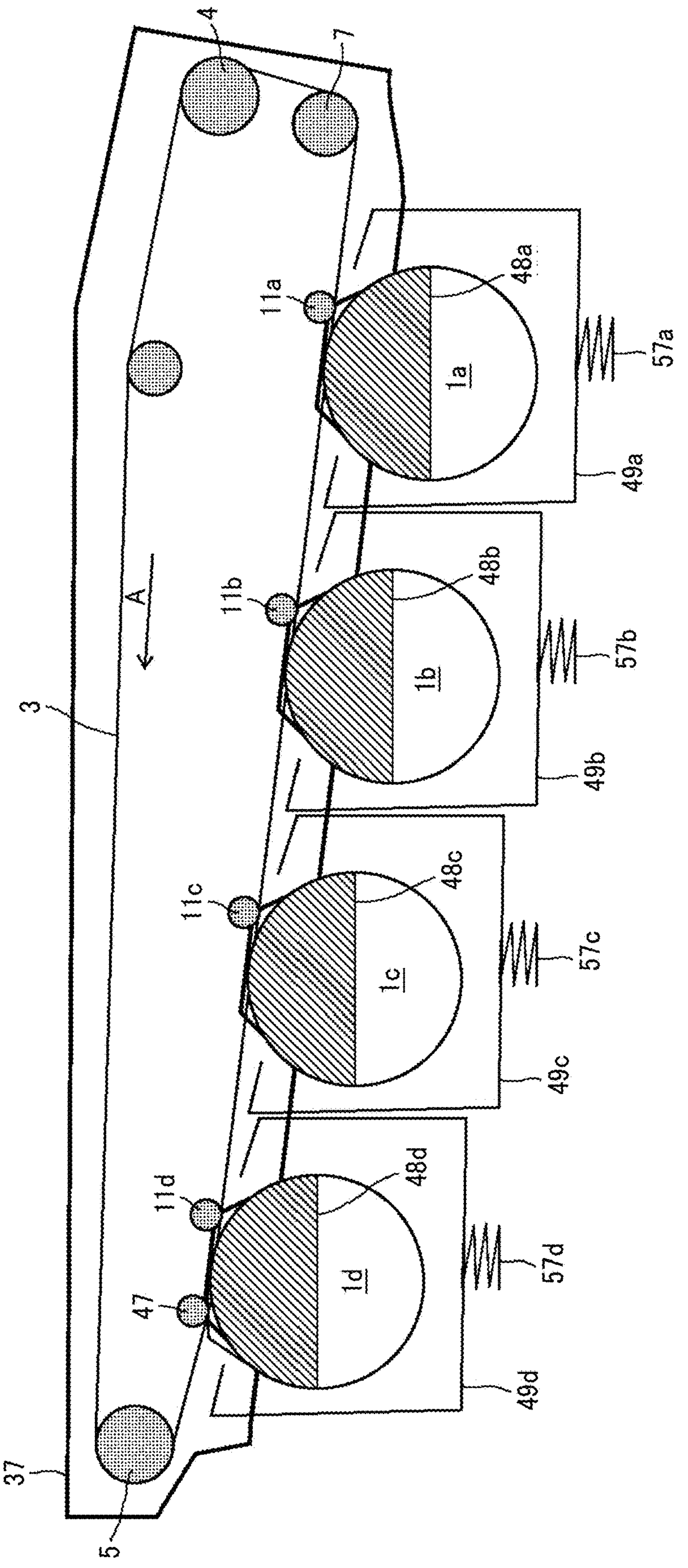
FIG. 5 is a schematic view of the intermediate transferor unit and the photoconductor unit on the front side in the removal direction.

FIG. 4 is a schematic view of an intermediate transfer unit and a photoconductor unit on the rear side in the removal direction. FIG. 5 is a schematic view of the intermediate transfer unit and the photoconductor unit on the front side in the removal direction. As illustrated in FIG. 4, on the rear side in the removal direction, the photoconductors 1*a*, 1*b*, 1*c*, and 1*d* are positioned by photoconductor pressing members 58*a*, 58*b*, 58*c*, and 58*d* as first pressing members that bring photoconductor contact members 53*a*, 53*b*, 53*c*, and 53*d* into contact with body side plate holders 54*a*, 54*b*, 54*c*, and 54*d*, respectively, disposed on the body structure side plate 55. As illustrated in FIG. 5, on the front side in the removal direction, the photoconductors 1*a*, 1*b*, 1*c*, and 1*d* are positioned by photoconductor pressing members 57*a*, 57*b*, 57*c*, and 57*d* as second pressing members that bring photoconductor contact members 48*a*, 48*b*, 48*c*, and 48*d*, respectively, into contact with the intermediate transferor frame 37 or another member disposed on the intermediate transferor frame 37.

Figure 6:
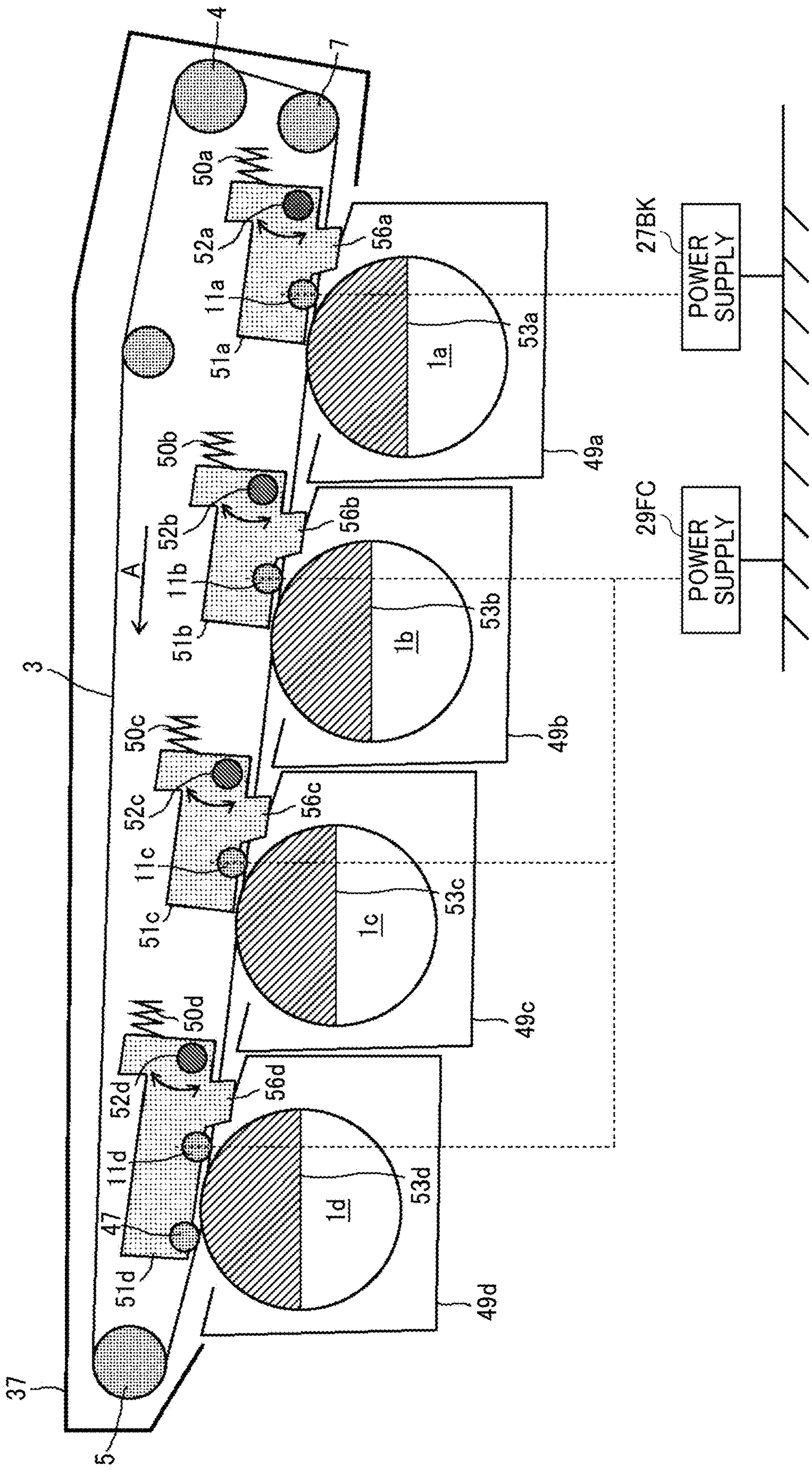
FIG. 6 is a diagram illustrating the position of a primary transfer roller on the rear side in the removal direction of the intermediate transferor unit.
Figure 7:
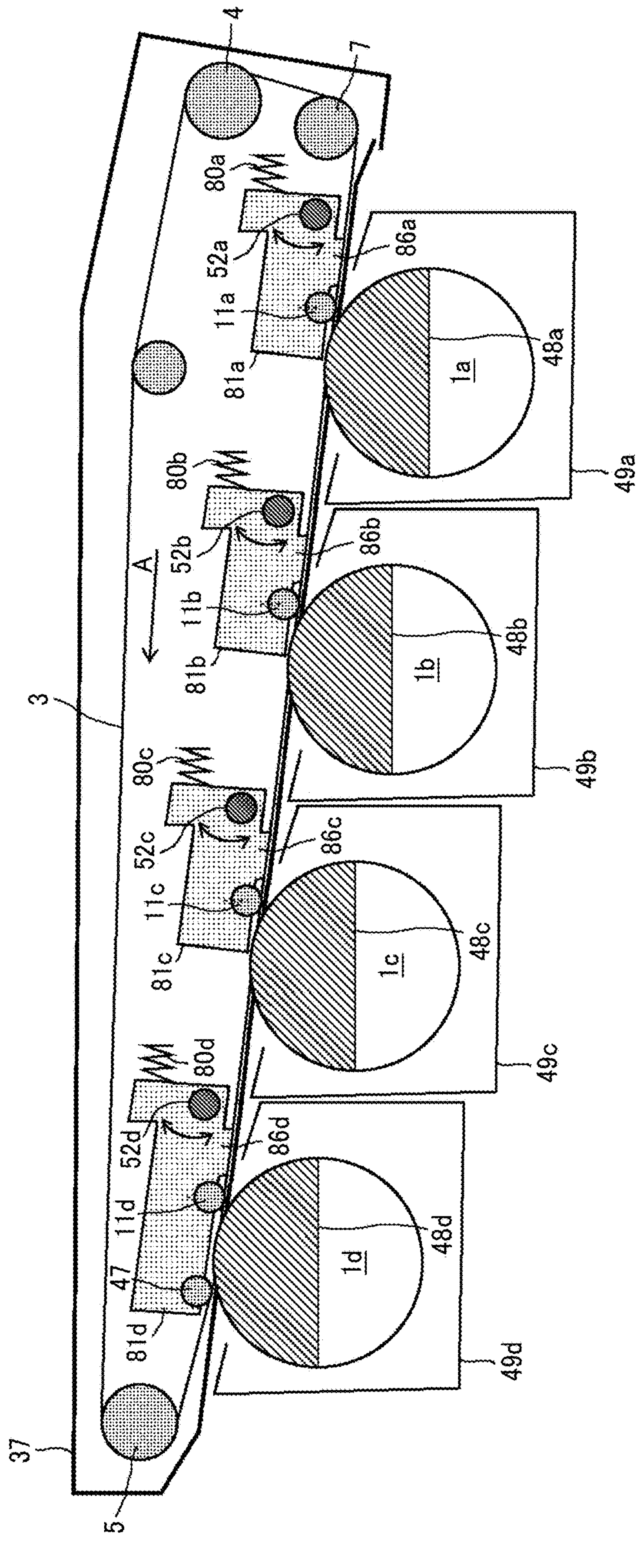
FIG. 7 is a diagram illustrating the position of the primary transfer roller on the front side in the removal direction of the intermediate transferor unit.

Next, a description is given of the positioning of the primary transfer rollers 11*a*, 11*b*, 11*c*, and 11*d* with reference to FIGS. 6 and 7. FIG. 6 is a diagram illustrating the positions of the primary transfer rollers 11*a*, 11*b*, 11*c*, and 11*d* on the rear side in the removal direction of the intermediate transferor unit. FIG. 7 is a diagram illustrating the positions of the primary transfer rollers 11*a*, 11*b*, 11*c*, and 11*d* on the front side in the removal direction of the intermediate transferor unit. In the image forming apparatus 100 illustrated in FIG. 6, the primary transfer rollers 11*a*, 11*b*, 11*c*, and 11*d* for the respective colors are held by primary-transfer-roller holding members 51*a*, 51*b*, 51*c*, and 51*d* (examples of holding members), respectively. First pressure members 50*a*, 50*b*, 50*c*, and 50*d* that press the primary transfer rollers 11*a*, 11*b*, 11*c*, and 11*d* are disposed on the primary-transfer-roller holding members 51*a*, 51*b*, 51*c*, and 51*d*, respectively. The primary-transfer-roller holding members 51*a*, 51*b*, 51*c*, and 51*d* can rotate around rotation shafts 52*a*, 52*b*, 52*c*, and 52*d* by the pressing force of the first pressure members 50*a*, 50*b*, 50*c*, and 50*d*. Contacting portions 56*a*, 56*b*, 56*c*, and 56*d* formed at the lower portions of the primary-transfer-roller holding members 51*a*, 51*b*, 51*c*, and 51*d* contact the photoconductor frames 49*a*, 49*b*, 49*c*, and 49*d*. Accordingly, the primary-transfer-roller holding members 51*a*, 51*b*, 51*c*, and 51*d* are contacted against the photoconductor frames 49*a*, 49*b*, 49*c*, and 49*d* so that the primary transfer rollers 11*a*, 11*b*, 11*c*, and 11*d* are positioned, respectively. Such a configuration minimizes the variation in the positional relation of the primary transfer rollers 11*a*, 11*b*, 11*c*, and 11*d* with respect to the photoconductors 1*a*, 1*b*, 1*c*, and 1*d*, and reduces the variation in image density. Such a configuration facilitates the insertion and removal of the intermediate transferor unit 60 into and from the apparatus body, and realizes reducing the size and cost of the apparatus. The intermediate transferor frame 37 holds the intermediate transfer belt 3 and rotatably holds primary-transfer-roller holding members 51*a*, 51*b*, 51*c*, and 51*d*.

Next, a description is given of the positioning of the primary transfer rollers 11*a*, 11*b*, 11*c*, and 11*d* on the front side in the removal direction. In the image forming apparatus 100 illustrated in FIG. 7, on the front side in the removal direction, the primary transfer rollers 11*a*, 11*b*, 11*c*, and 11*d* are held by primary-transfer-roller holding members 81*a*, 81*b*, 81*c*, and 81*d* (examples of holding members), respectively. Second pressure members 80*a*, 80*b*, 80*c*, and 80*d* that press the primary transfer rollers 11*a*, 11*b*, 11*c*, and 11*d* are disposed in the primary-transfer-roller holding members 81*a*, 81*b*, 81*c*, and 81*d*. The primary-transfer-roller holding members 81*a*, 81*b*, 81*c*, and 81*d* can rotate around the rotation shafts 52*a*, 52*b*, 52*c*, and 52*d* by the pressing force of the second pressure members 80*a*, 80*b*, 80*c*, and 80*d*. Contacting portions 86*a*, 86*b*, 86*c*, and 86*d* formed at the lower portions of the primary-transfer-roller holding members 81*a*, 81*b*, 81*c*, and 81*d* contact the intermediate transferor frame 37. Accordingly, the primary transfer roller holding members 81*a*, 81*b*, 81*c*, and 81*d* are contacted against the intermediate transferor frame 37 by the second pressure members 80*a*, 80*b*, 80*c*, and 80*d* to position the primary transfer rollers 11*a*, 11*b*, 11*c*, and 11*d*, respectively. The intermediate transferor frame 37 holds the intermediate transfer belt 3 and rotatably holds the primary-transfer-roller holding members 81*a*, 81*b*, 81*c*, and 81*d*.

Even if the primary transfer rollers 11*a*, 11*b*, 11*c*, and 11*d* are positioned by contacting against the intermediate transferor frame 37, the positional variation of the primary transfer rollers 11*a*, 11*b*, 11*c*, and 11*d* with respect to the photoconductors 1*a*, 1*b*, 1*c*, and 1*d* does not increase. As described above, the positions of the photoconductors 1*a*, 1*b*, 1*c*, 1*d* on the front side in the removal direction are determined by bringing the photoconductor contact members 48*a*, 48*b*, 48*c*, 48*d* into contact with the intermediate transferor frame 37. Even if the primary transfer rollers 11*a*, 11*b*, 11*c*, and 11*d* are positioned by contacting against the intermediate transferor frame 37, the positional variation of the primary transfer rollers 11*a*, 11*b*, 11*c*, and 11*d* with respect to the photoconductors 1*a*, 1*b*, 1*c*, and 1*d* does not increase.

The smaller the positional variation of the primary transfer rollers 11*a*, 11*b*, 11*c*, and 11*d* with respect to the photoconductors 1*a*, 1*b*, 1*c*, and 1*d*, the smaller the variation in the image density at the rear and front sides in the removal direction, and thus the preferable images can be provided.

In summary, in the image forming apparatus 100, the primary-transfer-roller holding members 81*a*, 81*b*, 81*c*, and 81*d* are contacted against the intermediate transferor frame 37 (FIG. 7) after one end of each of the photoconductors 1*a*, 1*b*, 1*c*, and 1*d* is contacted against one end of the intermediate transferor frame 37 to position the photoconductors 1*a*, 1*b*, 1*c*, and 1*d* and the intermediate transferor frame 37 (FIG. 5), so that the primary transfer rollers 11*a*, 11*b*, 11*c*, and 11*d* on one end can be positioned with high precision. In addition, since the intermediate transferor unit 60 can be attached and detached in the main scanning direction, the intermediate transferor unit 60 also can be easily attached to and detached from the apparatus body.

The other end of each of the photoconductors 1*a*, 1*b*, 1*c*, and 1*d* is positioned by being pressed by the body structure side plate 55 of in consideration of the ease of attachment and detachment of the intermediate transferor unit 60 (FIG. 4). At this time, the primary transfer roller holding members 81*a*, 81*b*, 81*c*, and 81*d* are contacted against the photoconductor frames 49*a*, 49*b*, 49*c*, and 49*d* in order to determine the positions of the primary transfer roller holding members 81*a*, 81*b*, 81*c*, and 81*d* on the other end. Such a configuration can accurately determine the positions of the primary transfer rollers 11*a*, 11*b*, 11*c*, and 11*d* with respect to the photoconductors 1*a*, 1*b*, 1*c*, and 1*d*, so that the deviation of the image density is reduced.

As illustrated in FIGS. 6 and 7, a backup roller 47 that contacts the inner circumference of the intermediate transfer belt 3 to rotate is disposed upstream from the primary transfer rollers 11*a*, 11*b*, 11*c*, and 11*d* for the respective colors. Such a configuration can form the shape of the transfer nip that is formed between the photoconductor 1*d* and the intermediate transfer belt 3 and located at the most upstream side as intended. The backup roller 47 is held at both ends (FIGS. 6 and 7) by the primary-transfer-roller holding members 51*d* and 81*d* located on the most upstream side (yellow in the present embodiment) in the rotation direction of the intermediate transfer belt 3. The primary-transfer-roller holding members 51*d* and 81*d* are second holding members that hold the backup roller 47. In other words, the holding member that holds the most upstream primary transfer roller 11*d* among the plurality of primary transfer rollers 11*a*, 11*b*, 11*c*, and 11*d* and the second holding member that holds the backup roller 47 are the same member. A backup roller pressure member 72 (see FIG. 10) as a third pressure member, the first pressure members 50*a*, 50*b*, 50*c*, and 50*d* (FIG. 6), and the second pressure members 80*a*, 80*b*, 80*c*, and 80*d* (FIG. 7) are the same members. The other primary transfer rollers 11*a*, 11*b*, and 11*c* are held at both ends (FIGS. 6 and 7) by the primary-transfer-roller holding members 51*a*, 51*b*, 51*c* and the primary-transfer-roller holding members 81*a*, 81*b*, and 81*c*, respectively. The contact-and-separation mechanism 90 is disposed that contacts and separates the primary transfer rollers 11*a*, 11*b*, 11*c*, and 11*d* against and from the intermediate transfer belt 3 to contact and separate the intermediate transfer belt 3 against and from the photoconductors 1*a*, 1*b*, 1*c*, and 1*d* (see FIG. 10). Such a configuration can downsize the image forming apparatus 100, can reduce the manufacturing cost, and can simplify the apparatus structure as compared with the case where the backup roller 47 is separately disposed.

In order to position the primary transfer rollers 11*a*, 11*b*, 11*c*, and 11*d* and the backup roller 47, the second holding member that holds the backup roller is positioned to the photoconductor frames 49*a*, 49*b*, 49*c*, and 49*d* (FIG. 6) or the intermediate transferor frame 37 (FIG. 7).

In the image forming apparatus 100, a belt skew correction mechanism 150 is provided for the tension roller 5, which is a rotator that is positioned upstream from the backup roller 47 and is inclinable to support the intermediate transfer belt 3. The belt skew correction mechanism 150 inclines the tension roller 5 to correct the skew of the intermediate transfer belt 3. The belt skew correction mechanism 150 is disposed so that the durability against cracking of the intermediate transfer belt 3 can be enhanced and the life of the intermediate transfer belt 3 can be extended.

Figure 8:
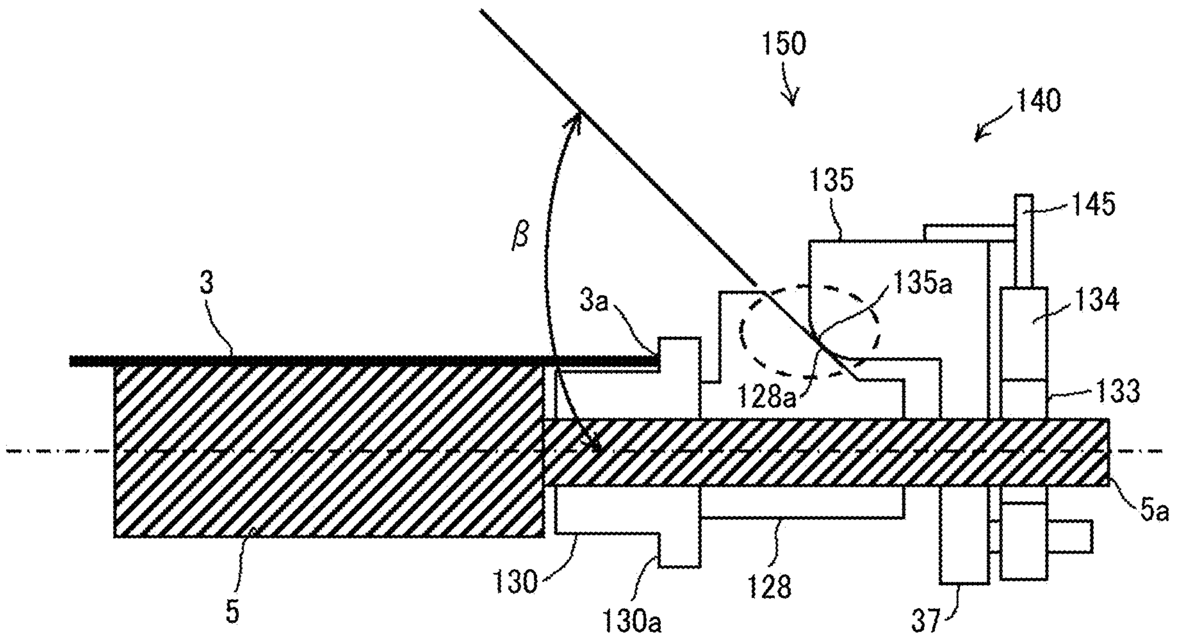
FIG. 8 is a schematic view of a belt skew correction mechanism that corrects a skew of the belt.

FIG. 8 is a schematic view of the belt skew correction mechanism that corrects the skew of the belt. The belt skew correction mechanism 150 is a correction mechanism that corrects the skew of the belt by inclining the tension roller 5. The belt skew correction mechanism 150 is disposed at an end of the tension roller 5 in the axial direction and includes a belt end detecting member 130 and a belt position correction unit 140. The belt end detecting member 130 has a cylindrical shape and is disposed on a roller shaft 5*a* of the tension roller 5 to be movable in the roller axis direction. The belt end detecting member 130 has a flat portion 130*a* extending substantially perpendicularly to the roller axis direction. The periphery of the flat portion 130*a* is formed in a circular shape, and the center of the circle is on the axis of the tension roller 5. The flat portion 130*a* functions as a belt contact portion with which an end (belt end 3*a*) of the intermediate transfer belt 3 contacts when the intermediate transfer belt 3 moves outward in the roller axial direction.

As illustrated in FIG. 8, the roller shaft 5*a* is disposed coaxially with the roller shaft 5*a* of the tension roller 5. The roller shaft 5*a* has a cylindrical shape having a smaller radius than the tension roller 5, is united with the tension roller 5, and penetrates the belt end detecting member 130, a shaft inclining member 128 of the belt position correction unit 140, and a tension roller supporting member 133.

When the belt end 3*a* contacts the flat portion 130*a* of the belt end detecting member 130, the belt end detecting member 130 disposed to be movable in a roller shaft 5*a* direction moves in the axial direction of the tension roller 5 (referred to as a roller shaft 5*a* direction).

The belt position correction unit 140 includes a shaft inclining member 128, a guide 135, a rotation support member 134, the tension roller support member 133, and a roller shaft supporting spring 145. The shaft inclining member 128 is disposed on the roller shaft 5*a* to contact the belt end detecting member 130 on the inner side in the roller shaft 5*a* direction. When the belt end 3*a* contacts the belt end detecting member 130 and the belt end detecting member 130 moves outward in the axial direction, the shaft inclining member 128 is pushed by the belt end detecting member 130 to move outward in the roller shaft 5*a* direction. The shaft inclining member 128 has an inclined surface 128*a*, which is a flat surface inclined with respect to the surface of the intermediate transfer belt 3, outward in the roller shaft 5*a* direction. As the shaft inclining member 128 moves in the roller shaft 5*a* direction, the inclined surface 128*a* also moves in the roller shaft 5*a* direction.

Figure 9:
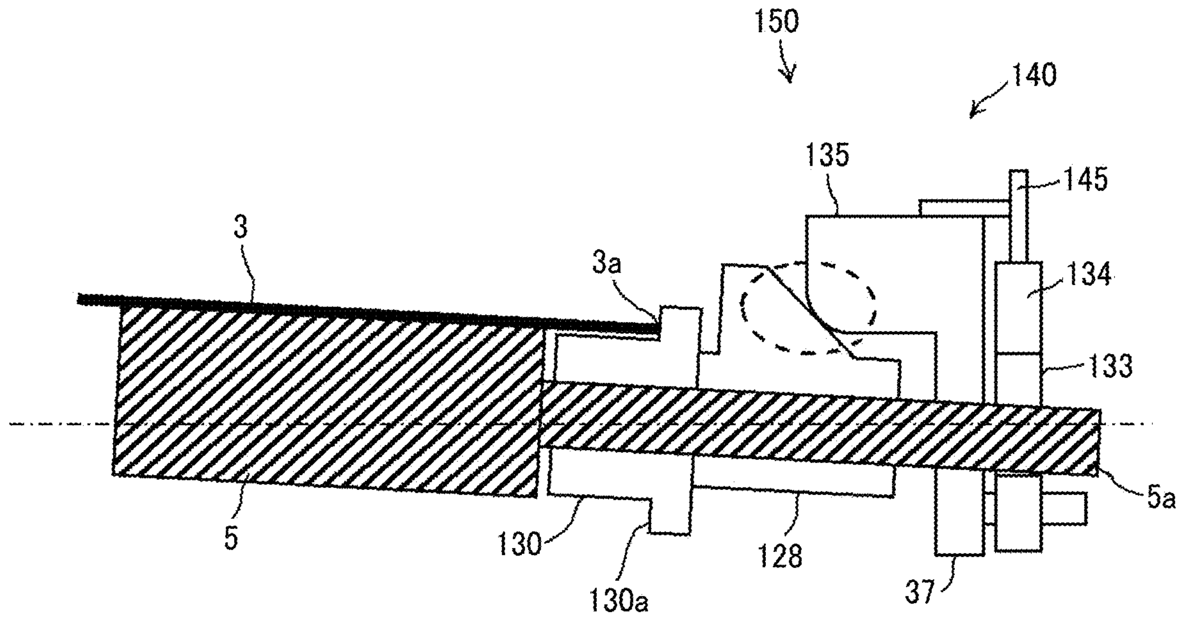
FIG. 9 is a schematic view of a tension roller that is inclined by a belt skew correction mechanism.

As illustrated in FIG. 8, the guide 135 is disposed to contact the inclined surface 128*a* of the shaft inclining member 128. The guide 135 contacts the inclined surface 128*a* of the shaft inclining member 128 at a shaft-displacement-portion contact portion 135*a* which is a part of the guide 135. Even when the roller shaft 5*a* and the shaft inclining member 128 are moved, the guide 135 is fixed not to be moved. With such a configuration, when the shaft inclining member 128 moves outward in the roller shaft 5*a* direction, the contact position between the shaft-displacement-portion contact portion 135*a* and the inclined surface 128*a* is shifted upward compared to the state of FIG. 8 as illustrated in FIG. 9, so that the shaft inclining member 128 and the roller shaft 5*a* penetrating the shaft inclining member 128 are inclined.

Figure 10:
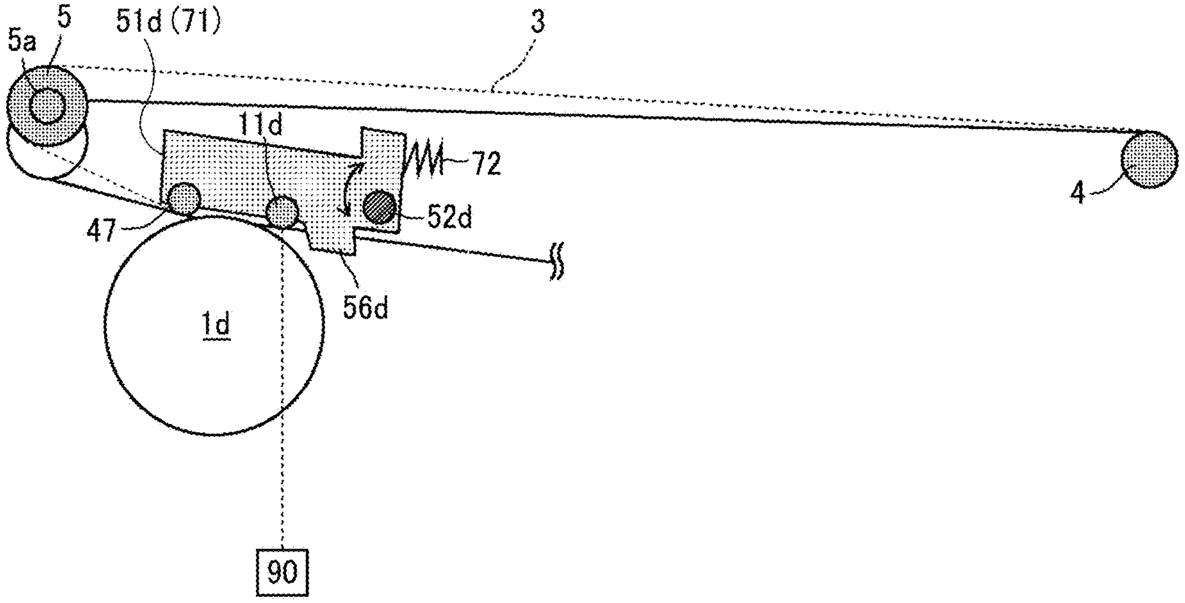
FIG. 10 is a schematic view of a tension roller at a position (dashed line) corresponding to FIG. 8 and a position (solid line) corresponding to FIG. 9.

The primary-transfer-roller holding member 51*a* that holds a primary transfer roller and a backup roller holding member 71 that holds a backup roller may be the same member including a primary-transfer-roller holding portion that holds the primary transfer roller 11*d* and a backup roller holding portion that holds the backup roller 47. In other words, the same member may be used as the primary-transfer-roller holding member 51*a* that holds a primary transfer roller and the backup roller holding member 71 that holds a backup roller. FIG. 10 is a schematic view of the tension roller 5 at a position (solid line) corresponding to FIG. 8 and a position (dashed line) corresponding to FIG. 9. FIG. 10 is a schematic view of the primary transfer roller 11*d* illustrating the position on the rear side in the removal direction of the intermediate transferor unit 60. However, the front side of the intermediate transferor unit 60 in the removal direction has also substantially the same configuration and includes a backup roller holding member and a backup roller pressure member. The primary transfer roller 11*d* and the backup roller 47 are held by a backup roller holding member 71 as a second holding member, and the backup roller holding member 71 is pressed by the backup roller pressure member 72 as a third pressure member. As illustrated by the solid line and the dashed line in FIG. 10, when the tension roller 5 and the roller shaft 5*a* are inclined, the angle at which the intermediate transfer belt 3 is wound around the backup roller 47 changes. Then, the force received by the backup roller holding member 71 also change, and thus, the position of the primary transfer roller 11*d* on the most upstream side becomes unstable in some cases. Accordingly, the pressing force of the backup roller pressure member 72 is set so that the backup roller holding member 71 located at the most upstream position contacts the intermediate transferor frame 37 (see FIG. 7) or the photoconductor frame 49*d* (see FIG. 6) on the front side in the removal direction regardless of the position of the inclined tension roller 5 when the intermediate transfer belt 3 contacts the photoconductors 1*a*, 1*b*, 1*c*, and 1*d*. Wherever the tension roller 5 and the roller shaft 5*a* are located, such a configuration always maintains the primary transfer roller 11*d*, which is held by the backup roller holding member 71, at the same position and can obtain a good image with little density deviation.

A description is given below of some aspects of the present disclosure.

First Aspect

An image forming apparatus (e.g., the image forming apparatus 100) includes a plurality of image bearers (e.g., the photoconductors 1*a*, 1*b*, 1*c*, and 1*d*), a plurality of frame members (e.g., the photoconductor frames 49*a*, 49*b*, 49*c*, and 49*d*), a plurality of contact members (e.g., the photoconductor contact members 53*a*, 53*b*, 53*c*, and 53*d*), an intermediate transferor (e.g., the intermediate transfer belt 3), a plurality of primary transfer members (e.g., the primary transfer rollers 11*a*, 11*b*, 11*c*, and 11*d*), a plurality of holding members (e.g., the primary-transfer-roller holding members 51*a*, 51*b*, 51*c*, and 51*d*), an intermediate transferor frame (e.g., the intermediate transferor frame 37), a plurality of pressure members (e.g., the first pressure members 50*a*, 50*b*, 50*c*, and 50*d*, the second pressure members 80*a*, 80*b*, 80*c*, and 80*d*, and the backup roller pressure member 72), and a plurality of pressing members (e.g., the photoconductor pressing members 58*a*, 58*b*, 58*c*, and 58*d*, the photoconductor pressing members 57*a*, 57*b*, 57*c*, and 57*d*). Each of the plurality of image bearers bear a toner image. Each of the plurality of frame members holds each of the plurality of image bearers. Each of the plurality of contact members positions each of the plurality of image bearers. The intermediate transferor is movable to secondarily transfer the toner image primarily transferred from each of the plurality of image bearers onto a recording medium. Each of the plurality of primary transfer members primarily transfers the toner image from each of the plurality of image bearers onto the intermediate transferor at a primary transfer portion at which each of the plurality of image bearers and an outer circumferential surface of the intermediate transferor contact with each other. Each of the plurality of holding members holds each of the plurality of primary transfer members. The intermediate transferor frame holds the intermediate transferor and holds each of the plurality of holding members to be rotatable. Each of the plurality of pressure members presses each of the plurality of holding members. Each of the plurality of pressing members presses each of the plurality of image bearers and each of the plurality of contact members against the intermediate transferor frame or a body structure side plate (e.g., the body structure side plate 55). The image forming apparatus contacts each of the holding members against the intermediate transferor frame or each of the plurality of frame members to position each of the plurality of primary transfer members. One end of each of the plurality of image bearers is positioned with each of the plurality of frame members and each of the plurality of contact members pressed against the intermediate transferor frame by each of the plurality of pressing members to position. Each of the plurality of pressure members contacts each of the plurality of holding members against the intermediate transferor frame so that each of the plurality of primary transfer members on the one end is positioned.

Second Aspect

In the image forming apparatus (e.g., the image forming apparatus 100) according to the first aspect, the other end of the plurality of image bearers (e.g., the photoconductors 1*a*, 1*b*, 1*c*, and 1*d*) is pressed against the body structure side plate (e.g., the body structure side plate 55) to be positioned. Each of the plurality of holding members (e.g., the primary-transfer-roller holding members 51*a*, 51*b*, 51*c*, and 51*d*) is contacted against each of the plurality of frame members (e.g., the photoconductor frame 49*a*, 49*b*, 49*c*, and 49*d*) so that each of the plurality of primary transfer members (e.g., the primary transfer rollers 11*a*, 11*b*, 11*c*, and 11*d*) on the other end of each of the plurality of image bearers is positioned.

Third Aspect

The image forming apparatus (e.g., the image forming apparatus 100) according to the first or second aspect includes a backup roller (e.g., the backup roller 47), a second holding member (e.g., the backup roller holding member 71), a third pressure member (e.g., the backup roller pressure member 72), and a contact-and-separation mechanism (e.g., the contact-and-separation mechanism 90). The backup roller is disposed upstream from each of the plurality of primary transfer members (e.g., the primary transfer rollers 11*a*, 11*b*, 11*c*, and 11*d*) and contacts an inner circumferential surface of the intermediate transferor (e.g., the intermediate transfer belt 3) to rotate. The second holding member holds the backup roller. The third pressure member presses the second holding member. The contact-and-separation mechanism contacts and separates each of the plurality of primary transfer members so that the intermediate transferor (e.g., the intermediate transfer belt 3) contacts against and separates from each of the plurality of image bearers (e.g., the photoconductors 1*a*, 1*b*, 1*c*, and 1*d*). The holding member (e.g., the primary-transfer-roller holding members 51*d*) that holds the most upstream primary transfer member (e.g., the primary transfer roller 11*d*) of the plurality of primary transfer members and the second holding member are the same member. The third pressure member and the pressure member are the same member. The other primary transfer members (e.g., the primary transfer rollers 11*a*, 11*b*, and 11*c*) are held by the holding members (e.g., the primary-transfer-roller holding members 51*a*, 51*b*, and 51*c*), respectively.

Fourth Aspect

The image forming apparatus (e.g., the image forming apparatus 100) according to the third aspect includes a rotator (e.g., the tension roller 5) and a correction mechanism (e.g., the belt skew correction mechanism 150). The rotator is positioned upstream from the backup roller (e.g., the backup roller 47), supports the intermediate transferor (e.g., the intermediate transfer belt 3), and is inclinable. The correction mechanism inclines the rotator to correct the skew of the intermediate transferor.

Fifth Aspect

In the image forming apparatus (e.g., the image forming apparatus 100) according to third or fourth aspect, the pressing force of the third pressure member (e.g., the backup roller pressure member 72) on the most upstream side is set such that the second holding member (e.g., the backup roller holding member 71) on the most upstream side is contacted against one of the plurality of frame members (e.g., the photoconductor frame 49*a*, 49*b*, 49*c*, and 49*d*) or the intermediate transferor frame (e.g., the intermediate transferor frame 37) wherever the inclined rotator (e.g., the tension roller 5) that supports the intermediate transferor (e.g., the intermediate transfer belt 3) is located when the intermediate transferor (e.g., the intermediate transfer belt 3) is contacted against all the image bearers (e.g., the photoconductors 1*a*, 1*b*, 1*c*, and 1*d*).

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming apparatus comprising:

a plurality of image bearers to bear toner images;

a plurality of frame members holding the plurality of image bearers, respectively;

a plurality of contact members positioning the plurality of image bearers, respectively;

an intermediate transferor movable to secondarily transfer the toner images primarily transferred from the plurality of image bearers onto a recording medium;

a plurality of primary transfer members to primarily transfer the toner images from the plurality of image bearers onto the intermediate transferor at primary transfer portions, respectively, at which the plurality of image bearers contact an outer circumferential surface of the intermediate transferor;

a plurality of holding members holding the plurality of primary transfer members, respectively;

an intermediate transferor frame holding the intermediate transferor and the plurality of holding members, with the plurality of holding members being rotatable;

a plurality of pressure members pressing the plurality of holding members; and a plurality of pressing members pressing the plurality of frame members and the plurality of contact members toward the intermediate transferor frame or a body structure side plate, wherein one end of the plurality of image bearers is positioned with the plurality of frame members and the plurality of contact members pressed toward the intermediate transferor frame by the plurality of pressing members, and wherein the plurality of primary transfer members are positioned on a same side as the one end, with the plurality of holding members contacted against the intermediate transferor frame by the plurality of pressure members.

2. The image forming apparatus according to claim 1, wherein another end of the plurality of image bearers is positioned by being pressed against the body structure side plate, and wherein the plurality of primary transfer members are positioned on a same side as said another end of the plurality of image bearers by the plurality of holding members contacting against the plurality of frame members.

3. The image forming apparatus according to claim 1, further comprising:

a backup roller disposed upstream from the plurality of primary transfer members to contact an inner circumferential surface of the intermediate transferor to rotate;

a second holding member holding the backup roller;

a third pressure member to press the second holding member; and a contact-and-separation mechanism to contact and separate the plurality of primary transfer members against and from the intermediate transferor to contact and separate the intermediate transferor against and from the plurality of image bearers, wherein the second holding member is a holding member of the plurality of holding members that holds a most upstream primary transfer member of the plurality of primary transfer members in a direction of rotation of the intermediate transferor, wherein the third pressure member is one of the plurality of pressure members, and wherein the other primary transfer members other than the holding member of the plurality of primary transfer members are held by the other holding members other than the second holding member of the plurality of holding members, respectively.

4. The image forming apparatus according to claim 3, further comprising:

an inclinable rotator upstream from the backup roller, to support the intermediate transferor; and a correction mechanism to incline the rotator to correct a skew of the intermediate transferor.

5. The image forming apparatus according to claim 3, wherein a pressing force of the third pressing member is set such that the second holding member contacts against the intermediate transferor frame or one of the plurality of frame members wherever the rotator is inclined and located when the intermediate transferor is contacted against all the plurality of image bearers.

* * * * *